United States Patent Office 2,874,165
Patented Feb. 17, 1959

2,874,165

REDUCTION OF CARBONYL COMPOUNDS WITH BORON HYDRIDES

Herbert C. Brown, West Lafayette, Ind.

No Drawing. Application April 25, 1955
Serial No. 503,829

15 Claims. (Cl. 260—343.6)

This invention relates to a novel process for the production of carbinols by reductions with diborane. This application is a continuation-in-part of my copending application S. N. 421,675, filed April 7, 1954, now U. S. Patent 2,709,704.

It is an object of the present invention to provide a process for the production of carbinols by the reduction of aldehydes and ketones with diborane in the presence of an organic solvent. Another object is the provision of a process for the production of carbinols involving selective reductions with diborane. Another object is the provision of a process for the production of carbinols involving reductions with diborane in the presence of preferred solvents. A further object is the provision of a process for the production of carbinols by the reduction of oxides with diborane. Still another object is the provision of a process for the production of substantially one carbinol by the selective reduction of a mixture of ketones with diborane. Other objects will be apparent to those skilled in the art to which this invention pertains.

According to the present invention, a carbinol producing compound as defined hereinafter is reduced with diborane, in an inert liquid organic solvent for the reactants, to produce a carbinol.

The reduction of acetone, acetaldehyde, and trimethylacetaldehyde with diborane is known in the art, H. C. Brown et al., J. Am. Chem. Soc. 61, 673 (1939). However, those reductions were performed in the absence of solvent. These original reductions were carried out with very small quantities of reactants, 10–50 mg. of the carbonyl compound and a corresponding quantity of diborane, in the absence of any solvents. In attempting to apply this reaction on a larger scale, severe difficulties were encountered. The reaction is highly exothermic and it is difficult to control the temperature. The rise in temperature results in the decomposition of diborane with the formation of hydrogen and higher hydrides of boron, some of which are difficult to remove from the reaction products. In the absence of solvents there are frequently produced solid products which contain unused boron-hydrogen bonds and poor yields result. Moreover, in the case of sensitive aldehydes, such as acetaldehyde, condensations and polymerizations occur. Finally, many viscous or solid aldehydes and ketones cannot be made to react with diborane under the experimental conditions of the prior art.

I have discovered that reductions in the presence of certain solvents have very important advantages, e. g., a higher yield of the carbinol than when the same reaction is performed in the absence of a solvent, avoidance of side reactions resulting from the decomposition of the diborane or the condensation or polymerization of the aldehyde or ketone, the ready isolation of the product in high purity by simple techniques, without the need for elaborate purification procedures, ready control of the rate of the reaction, and a far greater scope of applicability. Thus the use of these special solvents permit the ready reduction of solid aldehydes, ketones or oxides with great ease, although such reductions are difficult and usually impossible in the absence of a solvent.

An inert, liquid organic solvent for the process of the present invention is a solvent which is substantially unaffected by either the diborane, the starting compound or the resulting reduced compound, under the conditions of the reaction, and which is liquid at the reaction temperature. These solvents are free of amino, primary and secondary amido, hydroxy, cyano, oxido and ketaldo groups in the molecule. Preferred solvents, which are inert under the usual reaction conditions, e. g., at about room temperature, are aliphatic, alicyclic and aromatic hydrocarbons; halogenated aliphatic, alicyclic and aromatic hydrocarbons; carbon disulfide; aliphatic, alicyclic, cyclic and aromatic ethers; polyethers; nitroalkanes; nitrated aromatic hydrocarbons; esters; sulfides; sulfoxides and sulfones. The hydrocarbons, including the halogenated ones, and ethers are the more versatile solvents, being substantially inert even under the most rigorous of conditions and are the solvents ordinarily employed. When employed esters as solvents, mild reaction conditions are necessary as esters can be reduced with diborane, although with difficulty.

Amines are unsuited as solvents in the process of the present invention as they alter the reducing properties of diborane. Primary and secondary amides are similarly undesirable. Aldehydic and ketonic solvents react with diborane and are therefore unsuitable as solvents. Aliphatic, cyclic and alicyclic and aromatic alcohols also react with diborane and are therefore unsuited as solvents. Nitriles are similarly unsuited as solvents due to their effect upon the diborane. In general, a compound which possesses an hydroxyl function, an aldehydic, ketonic, oxido or cyano group, or a hydrogen substituted nitrogen atom is unsuited as a solvent.

The reaction must be performed under anhydrous conditions as the diborane reacts instantly with water. Anhydrous acids may, however, be present in the reaction mixture without affecting the diborane. Examples of such non-reactive acids are acetic acid and other higher molecular weight carboxylic acids free of reactive groups in the molecule, and the other aliphatic acids, p-toluenesulfonic acid and other sulfonic acids.

Aldehydes and ketones are generically described hereinafter as ketaldones. The term ketaldones has been employed before in U. S. Patent 2,335,384. The term ketaldo group generically defines aldehydic and ketonic groups. The term oxo compound can also be used to define aldehydes and ketones. With this nomenclature, a ketaldo group would be described as an oxo group. Ketaldones as a class have many chemical characteristics in common. In this instance, they are reduced by diborane to produce carbinols.

The starting ketaldones which are reduced, according to the process of the present invention, to carbinols are those with ketaldo groups having not more than two electronegative groups alpha thereto. An electronegative group has a high attraction for electrons. An electronegative group, according to this invention, is the R group of an acid R—CH$_2$COOH which is a stronger acid than acetic acid, i. e., an acid having a pKa of less than 4.70. Electronegative groups alpha to a ketaldo group reduce the susceptibility of the group to reduction with diborane; the more electronegative the alpha group or the greater the number of alpha electronegative groups, the more resistant the ketaldo group is to reduction. However, ketaldo groups having not more than two electronegative groups alpha thereto can be reduced with diborane. The preferred starting ketaldones are those whose ketaldo group has only one, or is preferably free of electronegative groups, alpha thereto, i. e., the carbon atom alpha to the aldehydic group or the two carbon atoms alpha to the keto group have only carbon-carbon or a combination of carbon-carbon and carbon-hydrogen bonds.

Examples of electronegative groups are fluorine, chlorine, bromine, iodine, alkoxy or aryloxy, nitro, alkylsulfonyl or arylsulfonyl ($RSO_2$—).

Examples of ketaldo groups having but one electronegative group alpha thereto are $\alpha$-haloketones and $\alpha$-haloaldehydes, e. g., $\alpha$-bromoketones and $\alpha$-bromoaldehydes. Whereas these halogenated ketaldones are difficult to reduce with other reducing agents to a halohydrin, diborane readily reduces the ketaldo group without affecting the halogen. Thus the process of the present invention provides a new and valuable process for the production of halohydrins.

I have discovered that certain functional groups may be present along with a ketaldo group, whereby selective reductions, not ordinarily possible with other reducing agents are attained. Examples of such functional groups are oxysulfur groups, e. g., sulfate, sulfones, sulfoxides, sulfonates, nitro groups, cyano groups, oxido groups, lactones and enol acylates. Although some of these groups can be reduced with diborane, e. g., an oxido group, their reactivity toward diborane is sufficiently low that a ketaldo group, having not more than one electronegative group alpha thereto, is reduced first. Thus, if an amount of diborane which is about that required to reduce the ketaldo group is employed, a selective reduction is achieved. In many instances even a chemical equivalent excess of diborane can be added to the mixture with achievement of a selective reduction, e. g., at minus forty to minus eighty degrees centigrade or for ten minutes or less at room temperature. Some of these functional groups, e. g. sulfate, nitro, are completely inert to diborane.

Another aspect of this invention is the production of carbinols by the reduction with diborane of an oxide. Heretofore, the reactivity of diborane towards an oxido group was not known. I have found that an oxide is reduced with diborane to a carbinol. This invention is limited to the reduction of oxides containing more than two carbon atoms. If the oxide is symmetrical, a single carbinol results from the reduction. If the oxide is unsymmetrical, a mixture of carbinols can be produced. However, a diborane reduction of an oxide is surprisingly selective and results in the production of a carbinol with the hydroxy group at the least substituted or least hindered carbon atom of the two carbon atoms to which the oxide group is attached. For example, a terminal oxide is reduced with diborane to produce a primary alcohol. For the most part, the carbinol resulting from the reduction of an oxide with diborane differs from the one produced by reducing agents such as lithium aluminum hydride or sodium borohydride, i. e., with the latter agents the hydroxyl group forms on the more substituted carbon atom.

As with the reduction of ketaldones, the reduction of an oxide is performed in the presence of an inert, liquid organic solvent for the reactants. The preferred solvents are those listed hereinbefore as preferred solvents in the reduction of ketaldones.

Certain mixtures of ketones can be selectively reduced with diborane in an inert, liquid organic solvent for the reactants to produce predominantly one carbinol. For example, a starting mixture which comprises two keto groups selected from two of the groups consisting of a six membered cyclic keto group, an alicyclic keto group, a five membered cyclic keto group, and an $\alpha$-electronegatively-substituted keto group is selectively reduced with about a chemical equivalent of diborane to produce predominantly one carbinol. In the absence of other hindering groups or electronegative groups, a six membered cyclic keto group is reduced before an alicyclic keto group, which is reduced before a five membered cyclic keto group, which is reduced before an $\alpha$-electronegatively-substituted keto group. The two keto groups in the starting mixture may be present in different keto compounds or be both present in a single diketo compound. For example, etiocholane-3,17-dione is selectively reduced with a chemical equivalent of diborane to 3-hydroxyetiocholane-17-one, viz., the six membered cyclic keto group is reduced before the five membered keto group. The reduction of a mixture of two keto groups as defined above is preferably performed in one of the preferred solvents listed above for a reduction of a ketaldone.

The diborane reductions of the present invention can be performed at a temperature between about minus 100 degrees centigrade and plus 200 degrees centigrade, the lower temperature being determined by the reactivity of the carbinol producing group toward diborane and the solubility of the reactants in the reaction solvent and the upper temperature, by the degree of selectivity desired and the amount of decomposition of diborane produced under the selected reaction conditions. The usual reaction temperature is between zero and 100 degrees centigrade. Ordinarily, room temperature, e. g., between about twenty and about thirty degrees centigrade, is preferred for its convenience and the consistently good results obtained at this temperature range.

Diborane is conveniently prepared from sodium borohydride or lithium aluminum hydride as shown by Shapiro et al., J. Am. Chem. Soc. 74, 901 (1952), and Elliott et al., ibid., 74, 5047 (1952). Other methods are also available and known in the art. The diborane is ordinarily bubbled into the solution of the starting, carbinol-producing compound in the selected reaction solvent.

The reaction of diborane with a carbinol-producing compound produces an oxyborine compound which can be decomposed with water or methanol. If water is employed, the thus produced boric acid can be extracted with base or by extraction of the carbinol with a water immiscible solvent in which the boric acid is substantially insoluble. If methanol is employed, the thus-produced methyl borate can be separated, e. g., by distillation as more fully disclosed in my copending application S. N. 421,675, now U. S. Patent 2,709,704.

The following examples are illustrative of the process and products of the present invention, but are not to be construed as limiting.

EXAMPLE 1

Diphenylcarbinol

In a one liter round-bottom flask fitted with a mercury sealed stirrer, an inlet for nitrogen, and a condenser, there are placed 91 grams (0.5 mole) of benzophenone in 400 milliliters of anhydrous ether. The flask is flushed with nitrogen and a nitrogen atmosphere is maintained. In a separate flask diborane is generated by the reaction of seventeen grams (0.25 mole) of boron trifluoride in ether with a solution in ether of 9.0 grams (0.25 mole) of lithium aluminum hydride. The gaseous diborane is passed into the reaction flask and the mixture is stirred for sixty minutes following completion of the addition. The ether is then distilled and to the residue in the flask are added 200 milliliters of methanol. On heating, the reaction mixture on a steam bath the methyl borate with excess methanol are volatilized, leaving a ninety gram residue of diphenylcarbinol.

EXAMPLE 2

$\Delta^5$-pregnene-3$\beta$,20-diol

In the same manner as described in Example 1, the reaction of a chemical equivalent excess of diborane with pregnenolone ($\Delta^5$-pregnene-3$\beta$-ol-20-one) in methylene chloride, followed by removal of the methylene chloride and addition of a large excess of methanol and thereafter distilling the whole to dryness, leaves a residue of Δ⁵-pregnene-3β,20-diol.

EXAMPLE 3
Benzyl alcohol

Bubbling 3.5 grams of diborane into a solution of fifty grams of freshly distilled benzaldehyde dissolved in 500 milliliters of tetrahydrofuran followed by removal of the solvent, addition of fifty milliliters of methanol to the mixture and then fractionally distilling the mixture of reaction products yields methyl borate, methanol and benzyl alcohol.

EXAMPLE 4
Tertiary butyl carbinol

The reaction of about seven grams of diborane with seventy grams of trimethylacetaldehyde in 500 milliliters of chloroform followed by the addition thereto of fifty milliliters of methanol and then distilling the chloroform, methyl borate, and methyl alcohol from the mixture leaves a mixture of about seventy grams of tertiary butyl carbinol melting at 52 to 53 degrees centigrade.

EXAMPLE 5
Pregnane-3,11,20-triol

Into a solution of 33 grams (0.01 mole) of pregnane-3,11,20-trione in 250 milliliters of methylene chloride was introduced diborane in excess of the theoretical 0.005 mole necessary to convert the three keto groups of pregnane-3,11,20-trione to carbonoxy-boron linkages. To the resulting mixture was added ten milliliters of dry methanol and the whole was then distilled to dryness, leaving a solid residue of pregnane-3,11,20-triol.

Following the procedure described in Examples 1 to 5, substantially the same results are obtained by substituting one of the following solvents, in which the starting compound is soluble, for the solvents employed therein: benzene, cyclohexane, chlorobenzene, tetrahydrofuran, carbon disulfide, anisole, nitrobenzene, and dimethylether of diethylene glycol.

EXAMPLE 6
Amyl alcohol

Following the procedure described in Example 1, a solution of valeraldehyde in carbon disulfide is reduced with diborane. The reduction mixture is mixed with water and then extracted with dilute sodium hydroxide. The carbon disulfide is then dried and distilled to leave a distillation residue of n-amyl alcohol.

EXAMPLE 7
3-nitrobenzyl alcohol

Following the procedure described in Example 1, 3-nitrobenzaldehyde is reduced with diborane in ether to 3-nitrobenzyl alcohol. Similarly, 3-acetylbenzenesulfonic acid is reduced to 3-(α-hydroxyethyl)-benzenesulfonic acid.

EXAMPLE 8
α,α-Dimethyl-β-hydroxybutyrolactone

Into a solution of 12.8 grams of α,α-dimethyl-β-ketobutyrolactone dissolved in fifty milliliters of methylene chloride is bubbled one gram of diborane. Twenty milliliters of methyl alcohol is added and the whole distilled to dryness on a steam bath. The residue consists essentially of α,α-dimethyl-β-hydroxybutyrolactone.

Following the procedure described in Example 8, but substituting 9.7 grams of α-ketovaleronitrile as the starting ketaldone, there is thus-produced α-hydroxyvaleronitrile.

EXAMPLE 9
3β,20-diacetoxy-20-pregnene-11-ol

Into a solution of 4.16 grams of 3β,20-diacetoxy-20-pregnene-11-one dissolved in 250 milliliters of dry benzene is bubbled 0.1 gram of diborane. Ten milliliters of water is added and the benzene layer extracted thoroughly with dilute aqueous sodium hydroxide and then dried. The benzene is distilled to give a distillation residue of 3β,20-diacetoxy-20-pregnene-11-ol.

EXAMPLE 10
Sec. butyl alcohol

Into a solution of 41 grams (0.5 mole) of butylene-2 oxide dissolved in 250 milliliters of a mixture of pentane hydrocarbons is bubbled seven grams of diborane at twenty degrees centigrade. The mixture is stirred for ten minutes and then mixed with fifty milliliters of methanol. The mixture is heated until the solvent, methanol and methyl borate, is distilled leaving a residue of sec. butyl alcohol.

EXAMPLE 11
n-Amyl alcohol

Following the procedure described in Example 10, n-amylene oxide is converted to n-amyl alcohol.

EXAMPLE 12
Cyclohexanol

Into a solution of 9.6 grams of cyclohexane and 9.8 grams of hexane-3-one dissolved in 500 milliliters of anhydrous ether is slowly bubbled 0.7 gram of diborane at ten degrees centigrade. The mixture is stirred for ten minutes and ten milliliters of water is added followed by a solution of four grams of sodium hydroxide dissolved in twenty milliliters of water. The ether layer is separated, dried and the ether distilled to leave a distillation residue consisting essentially of cyclohexanol and hexane-3-one.

Similarly, a mixture of 8.6 grams of pentane-2-one and 8.4 grams of cyclopentanone is reduced with 0.7 gram of diborane to a mixture of 3-pentanol and cyclopentanone.

I have also found that the liquid or easily liquified hydrides of diborane, i. e., tetraborane ($B_4H_{10}$), pentaborane ($B_5H_9$) and $B_5H_{11}$ and $B_6H_{10}$, also reduce ketaldones to carbinols. These hydrides have advantages over diborane. For example, they are considerably more inert toward water and moisture and care need not be taken to maintain anhydrous conditions during a reduction. Their ability to be handled as liquids permits more accurate measurement of the reducing agent for selective reductions. They also exhibit the selectivity found with diborane, but not always to the same degree. They are relatively inert toward oxysulfur groups, nitro groups, cyano groups, lactones and enol acylates, esters, and to a lesser degree, oxides. They may be used with the preferred organic solvents described herein, especially hydrocarbons, halogenated hydrocarbons and ethers. Substitution of any of these higher hydrides of boron for the diborane in the reactions described in Examples 1 to 9 is productive of the same reaction product.

It is to be understood that the invention is not to be limited to the exact details of operation or exact compounds shown and described, as obvious modifications and equivalents will be apparent to those skilled in the art, and the invention is to be limited only by the scope of the appended claims.

I claim:

1. A process for the production of a carbinol which comprises selectively reducing a ketaldone which has both a ketaldo group having not more than one electronegative group alpha thereto, and at least one additional functional group selected from the group consisting of an oxysulfur group, a nitro group, a cyano group, an oxido group, a lactone and an enol acylate, with about a chemical equivalent of diborane in an inert, liquid organic solvent for the reactants.

2. The process of claim 1 wherein the ketaldo group is free of electronegative groups alpha thereto.

3. The process of claim 1 wherein the ketaldo group is a ketone free of electronegative groups alpha thereto.

4. The process of claim 1 wherein the ketaldo group is an aldehyde free of electronegative groups alpha thereto.

5. The process of claim 1 wherein the solevnt is selected from the group consisting of hydrocarbons, halogenated hydrocarbons, ethers, carbon disulfide, sulfoxides, sulfones, nitrated aromatic hydrocarbons, nitrated saturated hydrocarbons, and esters.

6. The process of claim 1 wherein the ketaldo group contains not more than one electronegative group alpha thereto and the solvent is selected from the group consisting of hydrocarbons, halogenated hydrocarbons, ethers, carbon disulfide, sulfoxides, sulfones, nitrated aromatic hydrocarbons, nitrated saturated hydrocarbons, and esters.

7. The process of claim 1 wherein the ketaldo group is free of electronegative groups alpha thereto and the solvent is selected from the group consisting of hydrocarbons, halogenated hydrocarbons, ethers, carbon disulfide, sulfoxides, sulfones, nitrated aromatic hydrocarbons, nitrated saturated hydrocarbons, and esters.

8. The process of claim 1 wherein the ketaldo group is a ketone free of electronegative groups alpha thereto and the solvent is selected from the group consisting of hydrocarbons, halogenated hydrocarbons, ethers, carbon disulfide, sulfoxides, sulfones, nitrated aromatic hydrocarbons, nitrated saturated hydrocarbons, and esters.

9. The process of claim 1 wherein the ketaldo group is an aldehyde free of electronegative groups alpha thereto and the solvent is selected from the group consisting of hydrocarbons, halogenated hydrocarbons, ethers, carbon disulfide, sulfoxides, sulfones, nitrated aromatic hydrocarbons, nitrated saturated hydrocarbons, and esters.

10. A process for the production of a carbinol which comprises selectively reducing, with about a chemical equivalent of diborane, a starting mixture which comprises two keto groups from two of the groups consisting of a six membered cyclic keto group, an alicyclic keto group, a five membered cyclic keto group, and an α-electronegatively-substituted keto group, dissolved in an inert, liquid organic solvent for the reactants, to produce a reduction product which consists predominantly of a carbinol resulting from the reduction of only one of the keto groups in the starting mixture.

11. The process of claim 10 wherein the solvent is selected from the group consisting of hydrocarbons, halogenated hydrocarbons, ethers, carbon disulfide, sulfoxides, sulfones, nitrated aromatic hydrocarbons, nitrated saturated hydrocarbons, and esters.

12. A process for the production of a carbinol which comprises reducing, with diborane, an oxide containing more than two carbon atoms, in a liquid organic solvent for the reactants.

13. The process of claim 12 wherein the oxide is an unsymmetrical oxide.

14. The process of claim 12 wherein the oxide is an unsymmetrical terminal oxide.

15. The process of claim 12 wherein the solvent is selected from the group consisting of hydrocarbons, halogenated hydrocarbons, ethers, carbon disulfide, sulfones, sulfoxides, nitrated aromatic hydrocarbons, nitrated saturated hydrocarbons, and esters.

References Cited in the file of this patent

UNITED STATES PATENTS

| | | |
|---|---|---|
| 2,628,966 | Graber | Feb. 17, 1953 |
| 2,709,704 | Brown | May 3, 1955 |

OTHER REFERENCES

Brown: J. Am. Chem. Soc., March 1939, pages 673–80.